P. CATUCCI.
HOBBING GEAR CUTTER.
APPLICATION FILED JAN. 4, 1908.

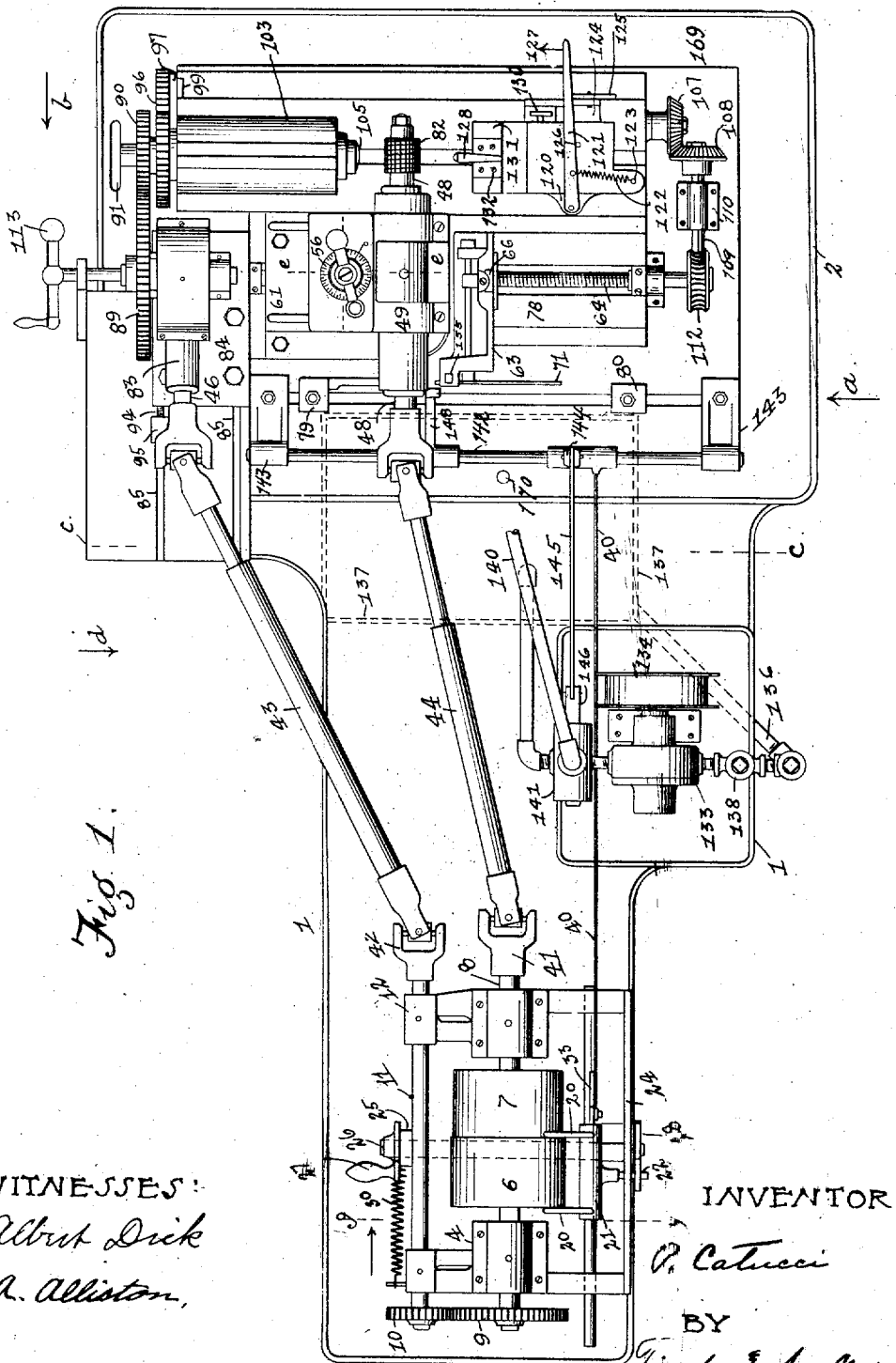

978,113.

Patented Dec. 6, 1910.
9 SHEETS—SHEET 2.

Fig. 19.

Fig. 2.

WITNESSES:
Albert Dick
C. A. Alliston

INVENTOR
P. Catucci
BY
Fischer & Sanders

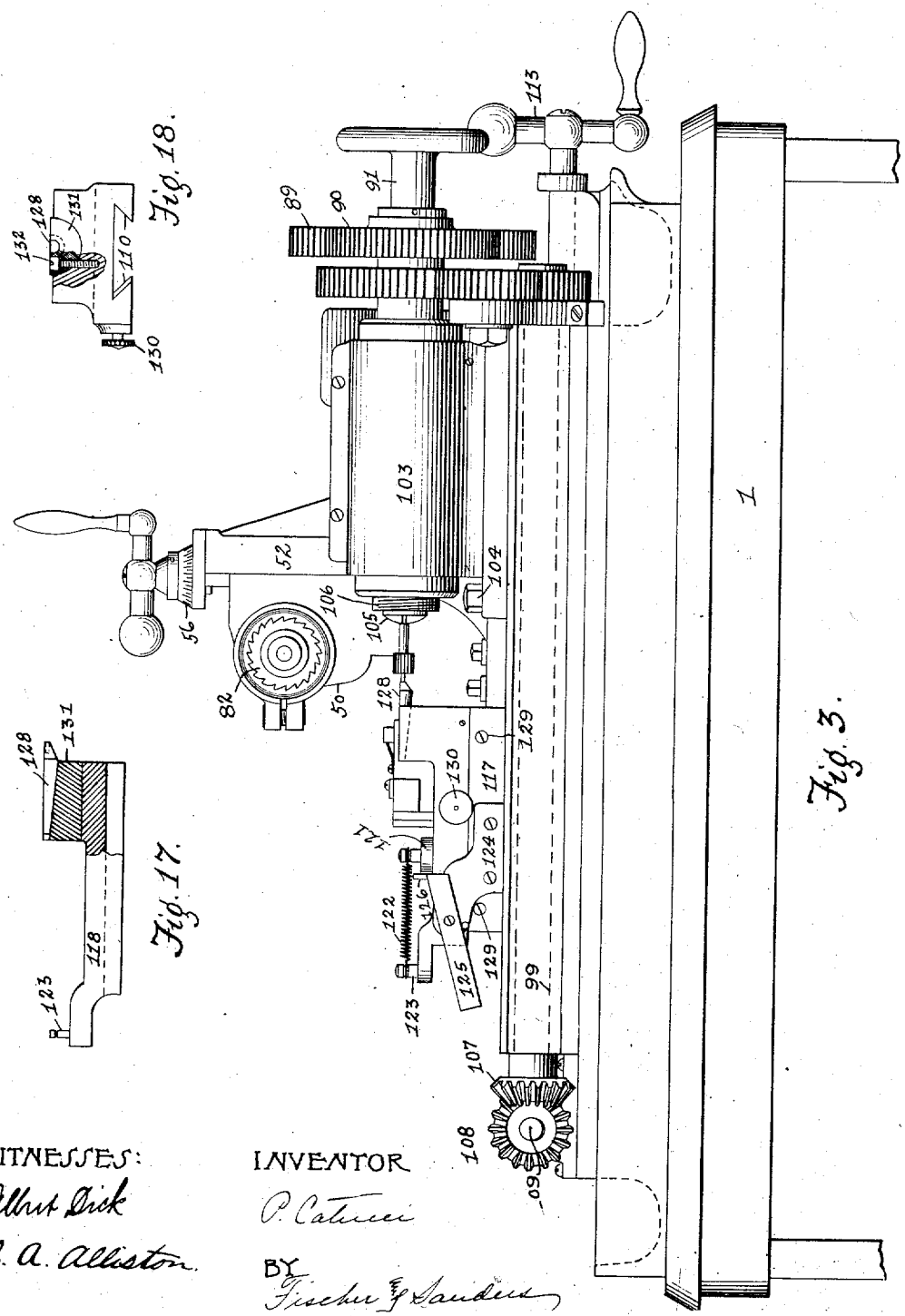

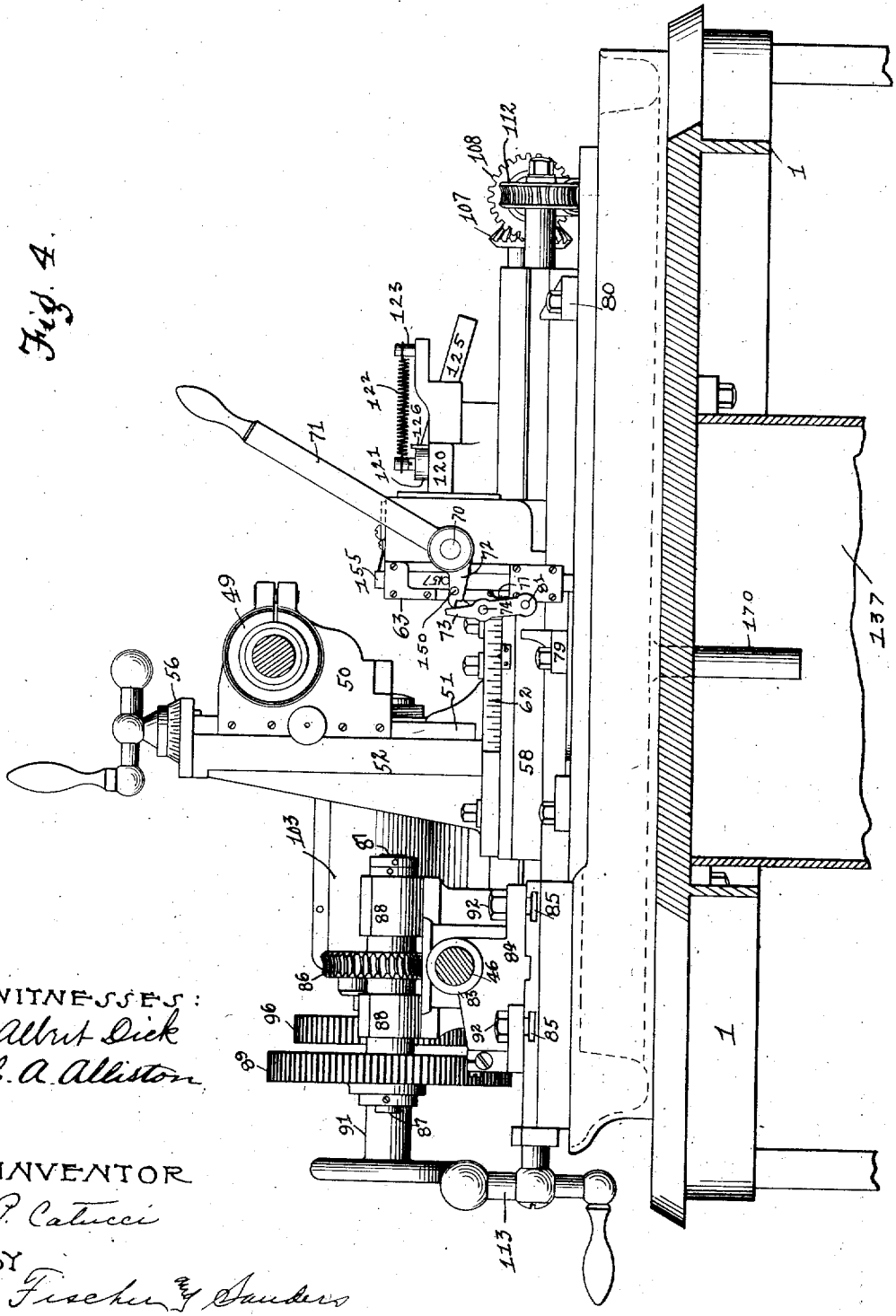

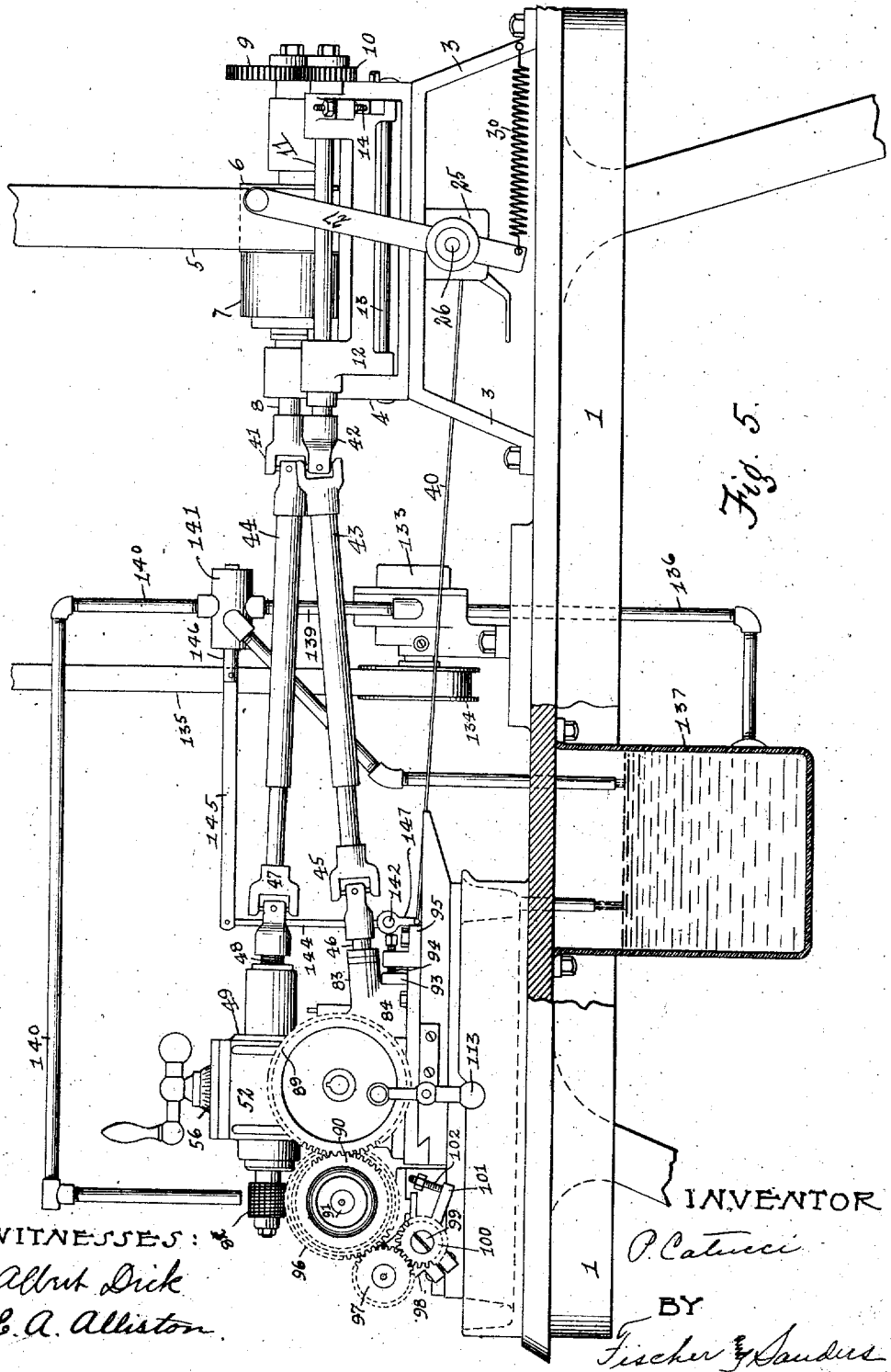

P. CATUCCI.
HOBBING GEAR CUTTER.
APPLICATION FILED JAN. 4, 1908.

978,113.

Patented Dec. 6, 1910.
9 SHEETS—SHEET 6.

WITNESSES:
Albert Dick
C. A. Alliston

INVENTOR
P. Catucci

BY
Fischer & Sanders

P. CATUCCI.
HOBBING GEAR CUTTER.
APPLICATION FILED JAN. 4, 1908.

978,113.

Patented Dec. 6, 1910.
9 SHEETS—SHEET 7.

WITNESSES:
Albrit Dick
C. A. Alliston

INVENTOR
P. Catucci
BY Fischer & Sanders
Attys

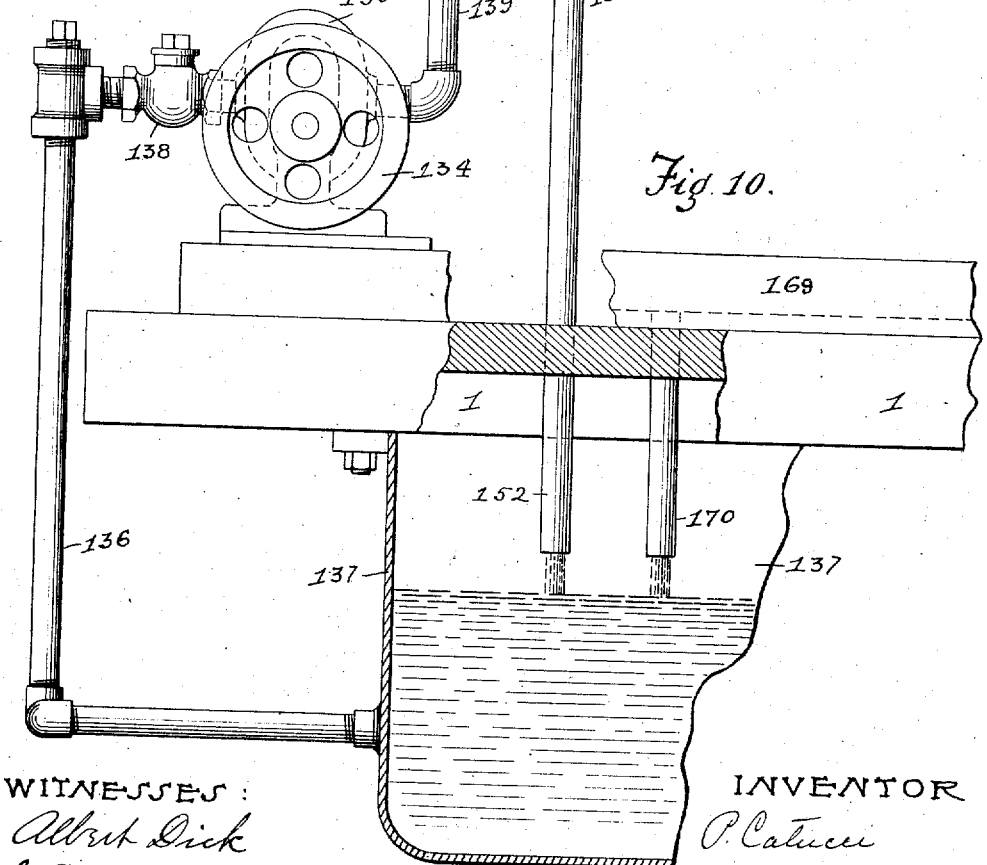

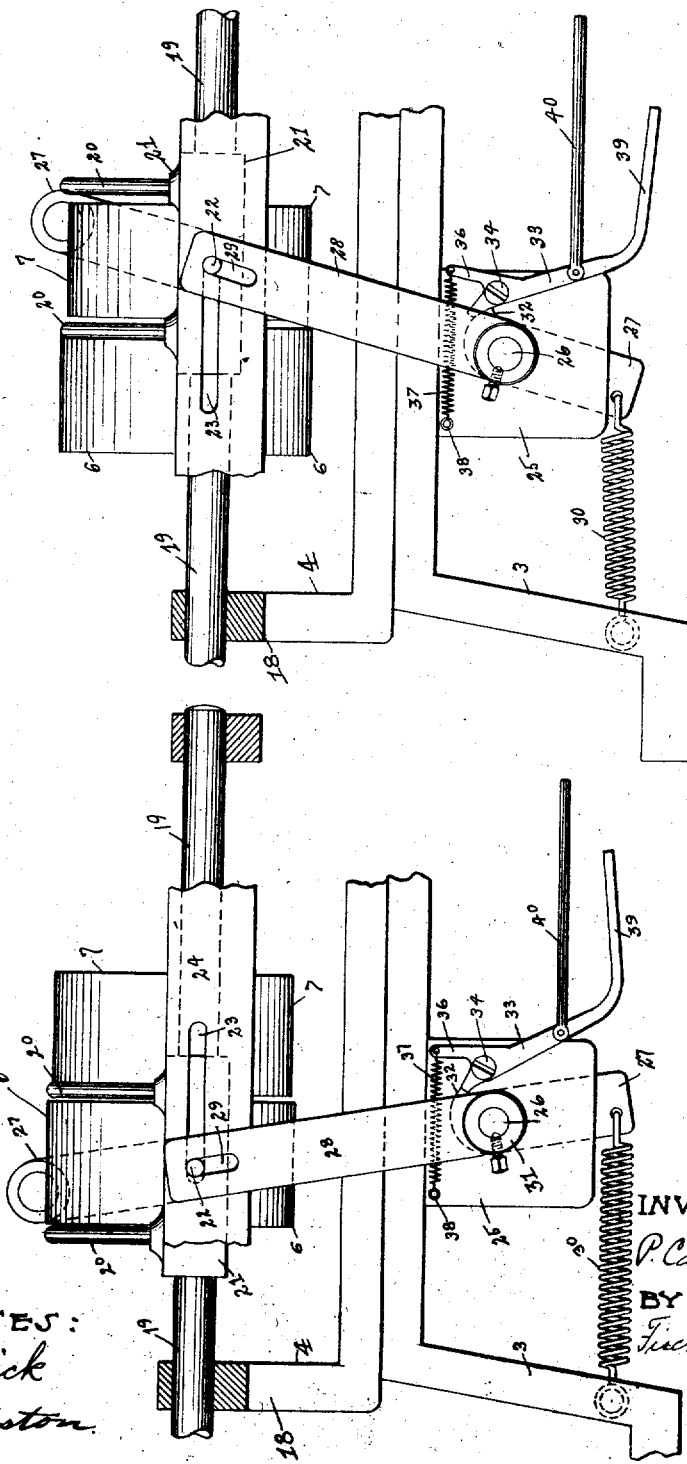

UNITED STATES PATENT OFFICE.

PLINY CATUCCI, OF NEWARK, NEW JERSEY, ASSIGNOR, BY MESNE ASSIGNMENTS, TO THE MEISSELBACH-CATUCCI MANUFACTURING COMPANY, A CORPORATION OF NEW JERSEY.

HOBBING GEAR-CUTTER.

978,113.   Specification of Letters Patent.   Patented Dec. 6, 1910.

Application filed January 4, 1908. Serial No. 409,277.

*To all whom it may concern:*

Be it known that I, PLINY CATUCCI, a citizen of the United States, residing at Newark, in the county of Essex and State of New Jersey, have invented certain new and useful Improvements in Hobbing Gear-Cutters, of which the following is a full, clear, and exact description, such as will enable others skilled in the art to which it pertains to make, construct, and use the same.

My invention relates to that class of gear cutters wherein the blank to be cut is mounted upon a continuously rotating blank spindle or chuck, and the teeth in said blank are formed or generated by means of what has come to be known in the art of gear cutting, as a "hob," and is designed for cutting large numbers of small gears and pinions, and while it is more specifically designed to cut spur gears and pinions, yet the adjustments are such that worm gears and spiral gears may be readily cut without change of construction.

The principal feature of my improvements consists in the arrangement, whereby the feed of the cutter is constant, the cutter being advanced at a speed which depends upon the number of teeth in the gear to be cut, and avoids the necessity of calculating the different rates of feed for the different numbers of teeth in the gear to be cut. These various feeds are effected by means of a series of change gears, hereinafter to be referred to, and the rate of feed, as above stated, depends upon the number of teeth in the gear to be cut, or upon the different metals of which the blank is made.

Figure 16:
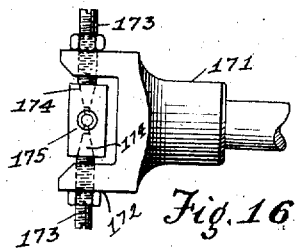
Figure 6:
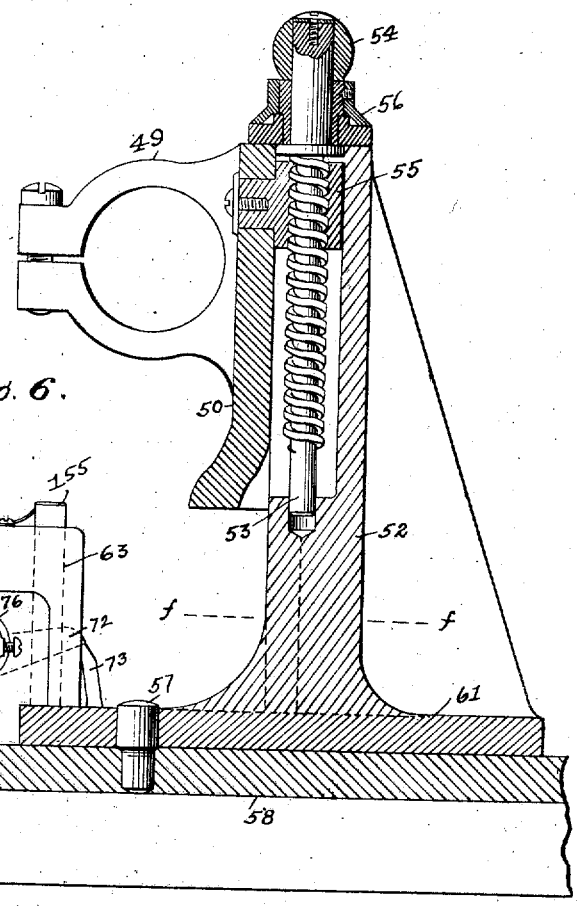
Figure 7:
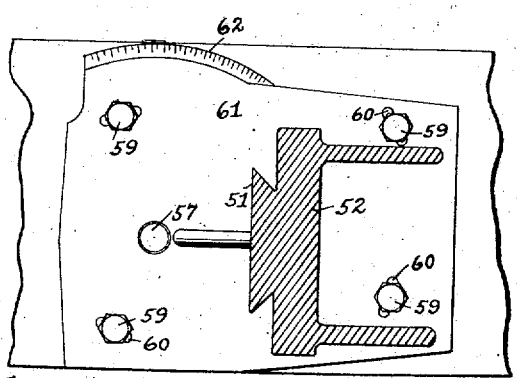
Figure 13:
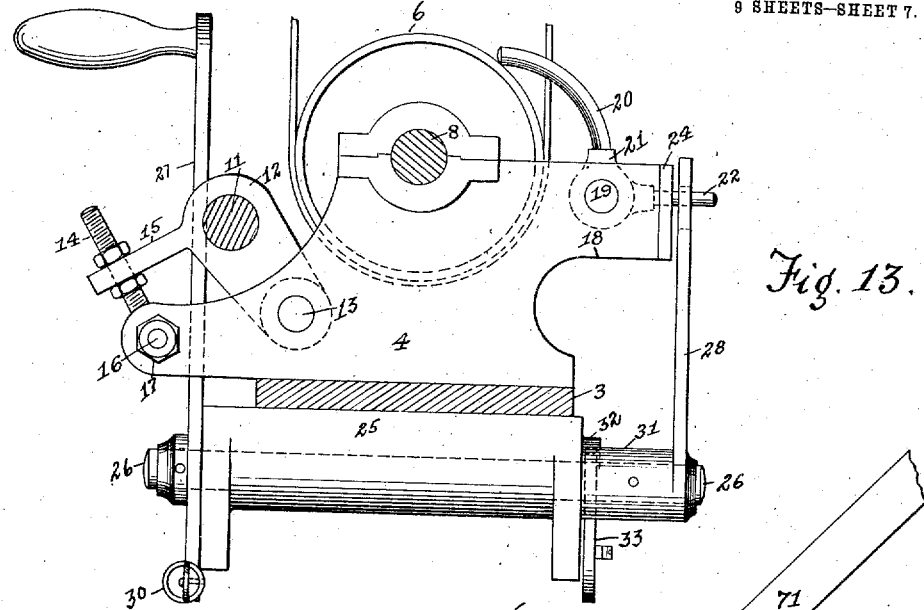
Figure 8:
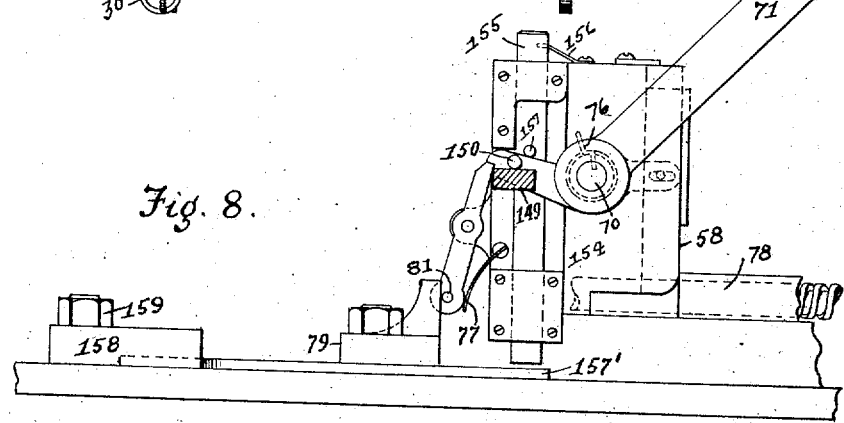
Figure 9:
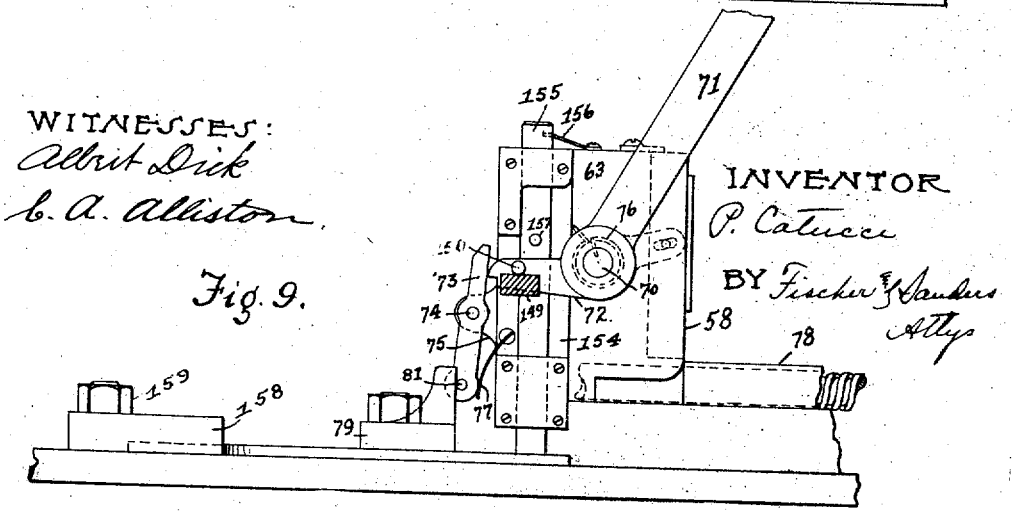

In the accompanying drawings forming a part of this specification, Figure 1 is a plan view of the entire structure, showing the arrangement of the countershafts and the oil pumping mechanism. Fig. 2 is an enlarged view of the operative parts of the mechanism looking in the direction of the arrow *a* in Fig. 1, but omitting the pumping mechanism and the countershaft. Fig. 3 is an end view of the cutter, looking in the direction of the arrow *b* in Fig. 1. Fig. 4 is a sectional view taken on line *c—c* in Fig. 1. Fig. 5 is a complete rear elevation looking in the direction of the arrow *d* in Fig. 1. Fig. 6 is a vertical section through the cutter carriage, with the cutter shaft removed, such section being taken on line *e—e* of Fig. 1. Fig. 7 is a sectional view of the cutter carriage, showing its method of angular adjustment, such section being taken on line *f* of Fig. 6. Figs. 8 and 9 are side elevations of the mechanism for throwing the feed into and out of gear, Fig. 8 showing the feed in gear, and Fig. 9 the gear released. Fig. 10 illustrates the oil pumping mechanism for lubricating the hob and the various parts. Fig. 11 is a vertical section of the three-way valve in the oil feed pipe. Fig. 12 is a vertical section of the same valve taken at right-angles to that shown in Fig. 11. Fig. 13 is a section of the countershaft and the parts related therewith, taken on line *g—g* of Fig. 1. Fig. 14 is a front elevation of the countershaft, and belt shifting device, partly in section, showing the mechanism for tripping the same. Fig. 15 is a similar view illustrating the belt-shifting device as tripped. Fig. 16 illustrates a plan view of one of the universal joints in one of the drive shafts. Fig. 17 is a detail view of the tail-stock, partly in section. Fig. 18 is an end view of the tail-stock, partly in section, showing the manner in which the center is held in position, and Fig. 19 is a detached end view of the cutter slide and clutch mechanism.

Similar letters of reference refer to like parts throughout the specification and drawings.

In the drawings, 1 is the base or frame upon which the entire mechanism is mounted, such frame having the right-hand end portion as illustrated in Fig. 1, broadened as at 2, for the purpose of mounting the cutter carriage and blank spindle operating mechanism.

3 is a standard mounted upon the base 1 to support the countershaft mechanism 4. The power for driving the entire structure, with the exception of the pumping mechanism, hereinafter described, comes from a shifting belt 5 leading from an overhead drive shaft. The belt 5 is carried over the loose pulley 7 from which it may be shifted to the fast pulley 6, said pulleys being mounted upon the horizontal shaft 8, mounted in suitable bearings in the frame or support 4. The outer end of the shaft 8 carries the driving gear 9, which meshes with the driven gear 10, mounted upon an adjustable shaft 11, the shaft 11 being carried by an adjustable rocking frame 12 which is mounted upon a horizontal rod 13, carried by the frame 4. The frame 12 being pivoted upon the rod 13 is capable of adjustment toward and away from the shaft 8 to provide for change gears to be substituted for the gears 9 and 10, for a purpose hereinafter to be described. When the proper gears are mounted upon shafts 8 and 11, the frame 12 is adjusted by means of the adjusting screw 14 carried by the projecting arm 15 from the frame 12, the lower end of said screw being connected by means of the bolt 16 to a projection 17 from the frame 4, (see Fig. 13).

Extending laterally from each end of the frame 4 are the projections 18, which carry the slide rod 19 upon which is mounted the belt shifting forks 20, such forks being mounted in a casting 21 secured to the rod 19. Projecting laterally from the casting 21 is the pin 22 which extends through a slot 23 in a side plate 24, said side plate being connected to the projections 18. Mounted on the under side of the standard 3, is a rock shaft bearing 25, carrying the rock shaft 26, at one end of which is secured the lever 27, and at the other end of which is carried the rock arm 28, said rock arm having a slot 29 at its upper end to receive the projecting pin 22 from the casting 21. The hand lever 27 projects below the shaft 26 and has connected therewith, a coiled spring 30, the opposite end of which is connected to the standard 3, so as to always maintain a spring tension upon the lever 27. The hub 31 of the rock arm 28 has cast thereon or otherwise secured thereto, a projection 32 for engagement with a spring pawl 33, pivoted at 34 upon the end of the bearing 25. This lever 33 has an upwardly projecting arm 36 to carry one end of the spring 37, the opposite end of which is secured at 38 to a pin projecting from the face of the bearing 25, the purpose of the spring 37 being to maintain engagement between the upper end of the pawl 33 and the projection 32. The spring pawl 33 has an extension 39, so that it can be tripped by hand when desired. It is also provided with a rod 40, leading to a part of the mechanism hereinafter to be described, so that the pawl 33 may be tripped automatically.

When the hand lever 27 is in the position illustrated in Fig. 14, the belt 5 will be shifted to run on the fast pulley 6, such lever being held in position against the tension of the spring 30 by means of the pawl 33, being in engagement with the projection 32 on the hub of the rock arm 28. When, however, the pawl 33 is tripped either by the rod 40 or by the handle 39, the tension of the spring 30 will cause the lever 27, rock arm 28, and the belt shifting forks 20 to fly over and shift the belt from the pulley 6 to the loose pulley 7, and thereby stop the rotation of the shaft 8. When it is desired to start the mechanism, it is only necessary to shift the hand lever 27 into the position illustrated in Fig. 14, so that the spring pawl 33 shall engage the projection 32 to lock the parts in position.

Secured to the inner ends of the shafts 8 and 11, are the universal couplings 41 and 42, said couplings being connected respectively to the telescoping shafts 43 and 44. The shaft 43 has its opposite end connected with the universal coupling 45, which in turn is connected with the main drive shaft 46. The shaft 44 is connected through the universal coupling 47 to the cutter shaft 48, said cutter shaft being adjustably mounted in bearings 49 in the cutter-housing 50.

The cutter-housing 50 is mounted in ways 51, for vertical adjustment upon the cutter carriage stanchion 52, as clearly shown in Figs. 6 and 7. Vertical adjustment of the cutter-housing 50 is accomplished by means of the vertical screw rod 53 secured in bearings in the stanchion 52 and has at its upper end, the crank 54, the rod 53 passing through a nut 55 secured to the housing 50 in any usual or desired manner, so that by the rotation of the screw 53 by means of the handle 54, the vertical adjustment of the housing 50 and with it the cutter shaft 48 is provided for.

Secured to the upper end of the screw 53, beneath the handle 54, is a micrometer cone 56, by which, fine vertical adjustments of the cutter shaft may be made. The stanchion 52 is mounted for radial adjustment about the center 57, upon the slide 58, such adjustment being fixed by means of the bolts 59, passing through the slots 60, in the base 61, of the stanchion 52, and threaded into the slide 58. At the side of the base 61, I provide a micrometer cone 62, whereby fine angular adjustments of the stanchion and with it, the cutter shaft 48, may be made. Mounted upon the forward end of the slide 58, is a frame 63 carrying the mechanism for throwing into and out of gear, the carriage feed. This carriage feed is provided for by means of a longitudinal screw 64, which receives its motion from mechanism hereinafter to be described. Projecting downwardly through a guide 66, in the forward end of the frame 63, is a vertical clutch member 65, carrying at its lower end a half-nut 67, for engagement with the feed screw 64. This vertical sliding clutch member 65 is thrown into and out of engagement with the feed screw 64 by means of a rock arm 68, taking over a horizontal pin 69 in the clutch member 65, said rock arm being mounted upon the rock-shaft 70. The rock shaft 70 is mounted in suitable bearings in the frame 63, and is provided at its outer end with the operating handle 71, such handle 71 being also provided with a lateral arm 72, for engagement with a trip pawl 73, pivotally mounted at 74 upon a bracket 75, integral with the frame 63. Surrounding the shaft 70, and within the frame 73, is a coiled spring 76, one end of which is secured to the shaft and the opposite end to the frame 63. The normal tendency of this spring is to throw the shaft into the position illustrated in Fig. 9, when the pawl 73 shall have been tripped from engagement with the arm 72. In this manner, the tripping of the pawl 73 in a manner hereinafter to be described, will result in releasing the clutch 65 from the feed screw 64. 77 is a small flat spring bearing upon the lower extended end of the pawl 73, for the purpose of maintaining the pawl 73 in engagement with the arm 72.

The slide 58 travels upon the guide 78 in a direction at right-angles to the normal position of the shaft 48. Mounted upon the side of the bed and so arranged as to be adjustable therealong, are the two stops 79 and 80, arranged in the path of a pin 81, projecting laterally from the lower end of the pawl 73, so that when the carriage slide 58 has been fed by means of the feed screw 64, heretofore described, to the end of the desired stroke, the engagement of the pin 81 with the stop 79, will trip the pawl 73 from the arm 72, when the spring 76 will be brought into action throwing the rock shaft 70 and arm 68 in a position to elevate the clutch 65 with its half-nut 67 out of engagement with the feed screw 64, when all further movement of the carriage slide 58 will cease.

The cutter shaft 48, heretofore described, as being mounted in the bearing 49 of the housing 50, projects through said bearing to a sufficient distance to permit of the mounting thereon, of the hob 82, directly over, or if desired, directly under, the position of the work piece to be operated upon the particular position of the cutter 82, being governed by the elevation or depression of the housing 50.

The longitudinal adjustment of the cutter shaft or spindle 48, forms an important feature of my invention, as it enables me to bring all parts of the cutter 82 successively into operation, as for example, when one part becomes worn, the bearing 49 with the spindle 48 may be shifted along to bring a new part of the cutter 82 into operation. Again, the radial or angular adjustment of the stanchion 52 about the center 57 and with it the spindle 48, might be to so great an angle as to carry the cutter 82 entirely away from the work piece. This longitudinal adjustment of the spindle bearing and spindle affords means to so extend the cutter to such a point that it may always engage the work piece, no matter what the angular adjustment of the spindle may be within the limits of the device. It further enables me to bring the teeth of the cutter back into synchronous movement with the teeth of the gear blank, should it at any time be necessary to remove the cutter from its spindle, as for example, to substitute a new cutter or to sharpen the old one. Under these circumstances, with the blank partly cut, it becomes necessary to replace the cutter in exactly the same synchronous relation with the work piece that the original cutter occupied.

I will now proceed to describe the mechanism for driving the work spindle.

The shaft 46 leads into a slightly inclined bearing 83, mounted upon a carriage 84, which travels in ways 85 at right-angles to the travel of the carriage slide 58. The inner end of the shaft 46 is provided with a worm, engaging the worm wheel 86, mounted upon a shaft 87, carried in suitable bearings 88 on the housing 84. The outer end of the shaft 87 carries a gear 89, which in turn engages a gear 90 upon the rear end of the work spindle 91. The two gears 89 and 90 are change gears, others being provided for producing a different rotational ratio between the work spindle shaft 91 and the cutter shaft 48. In order to provide for different sized gears to be substituted for 89 and 90, whatever their size may be, I make the housing or carriage 84 adjustable to and from the work spindle 91, so that when the proper gears are determined upon, the housing may be adjusted so as to bring the corresponding gears 89 and 90 into suitable engagement. The housing 84 may then be fixed in position by screwing home the nuts upon the bolts 92. The longitudinal adjustment of the housing 84 may be delicately provided for by means of the lug 93, carrying the screw 94, which passes through a suitable lug 95 adjacent thereto, the lug 95 being also longitudinally adjustable upon the bed.

Rigidly mounted upon the shaft 91, inside of the gear 90, is another spur gear 96, which in turn is in engagement with the gear 97, carried by the rock arm 98, said rock arm being mounted upon the end of the shaft 99. Rigidly mounted on the shaft 99, is a gear 100, for engagement with the gear 97, so that the rotation of the gear 96 may be communicated to the shaft 99, through the gears 97 and 100. The gears just described, are also change gears, so that different rotational ratios may be provided for between the shaft 91 and the shaft 99. In order to provide for the angular adjustment of the arm 98, so as to maintain proper engagement between the gears 96 and 97, I extend an adjusting arm 101 to the rear of the shaft 99, so that said arm may be engaged by an adjacent screw 102.

The work spindle 91 extends through bearings in the housing 103, said housing being suitably secured to the bed of the machine by means of the bolts 104. This work spindle is substantially the same in structure as the ordinary head stock of a lathe, and for that reason, it is not deemed necessary to further describe the same, other than to say, that the ordinary chuck 105 may be secured therein, in which to hold a rod or a mandrel, which carries the blank gear to be cut. The shaft 91 is also provided at its forward end 106 with a screw by means of which the ordinary face plate may be applied to the head stock.

The shaft 99 extends through the bed, and carries upon its opposite end, a miter gear 107, which engages with a corresponding miter gear 108, mounted upon a short shaft 109, carried in an inclined bearing 110, said bearing being suitably mounted upon the bed. The opposite end of the shaft 109 is provided with a worm 111, which is in engagement with the worm wheel 112, said worm wheel being carried by the forward end of the feed shaft 64, said feed shaft extending through from one side of the bed to the other, and having at its opposite end, the crank 113 for hand manipulation. The worm wheel 112 is loosely mounted upon the shaft 64, so that the crank 113 may be rotated in the same direction as the rotation of the shaft 64 to accelerate the movement of the slide 58, so as to bring the cutter 82 quickly into position for work, and this is accomplished by means of the pawl and ratchet mechanism 114 and 115, the spring pawl 115 being mounted upon the face of the worm wheel and engaging the ratchet 114, which is rigidly secured to the shaft 64. When the clutch 65 is disengaged from the feed screw 64, the slide 58 may be readily moved along its ways in either direction. It will thus be seen that when the two shafts 43 and 44 are driven, the motion of the shaft 43 is communicated directly to the cutter 82, while the motion of the shaft 44 is communicated through the worm wheel 86, and around through the gears 89 and 90 to the work spindle and from the gear 96 through the gears 97 and 100 to the shaft 99, and thence through the gears 107, 108, 111 and 112 to the feed shaft 64, so that when everything is in readiness for cutting a gear wheel, the cutter 82 will simultaneously rotate and be fed forward with the carriage slide 58, and this, while the work spindle and the blank carried thereby, are also rotating, the rate of rotation between the cutter and the work spindle being governed by the change gears heretofore referred to, and amounting to one complete revolution of the cutter to the advancement of one tooth of the blank. The stop 79 being properly located to trip the clutch 65, when the work of cutting the blank is completed, it will be seen that the pin 81 contacting with said stop 79 at the proper moment, will trip the lever 71 and thus throw the feed clutch 65 out of engagement with the feed screw 64.

Under some circumstances, the fixing of the blank to be cut into the chuck 105, is all that is necessary for the support of said blank. There are cases, however, where the work piece will be so frail that such support would be inadequate, under the strain produced by the cutter 82, so that it becomes necessary to support the blank not only from the chuck end, but also from the opposite end of the blank, and in order to provide for this, I mount upon the guides 116, a tail stock carriage 117, and upon said carriage 117, a supplemental carriage 118, also carried by ways 119 on the carriage 117. Projecting laterally from the carriage 117, is an arm 120, which forms a pivot bearing for the lever 121, the rear end of which lies across the upper face of the carriage 118, and is connected to said carriage by means of a coiled spring 122 to a pin 123, upon the rear end of the carriage 118.

Upon the side of the carriage 117, I mount a bracket 124, upon the upper end of which is the gravity pawl 125, which when in elevated position, lies in the path of the lever 121. Projecting upwardly from the upper face of the carriage 118, is a stop pin 126, lying in the path of the lever 121. Through the mechanism just described, it will be seen that when the lever 121 is moved forward in the direction of the arrow 127 in Fig. 1, the spring 122 will be put under tension, carrying with it, the slide 118, until the center 128 is brought in contact with the work piece or spindle upon which said work piece is carried, and the center 128 is held against such work piece under the tension of spring 122, it being understood that when the lever 121 is carried forward, as described, the gravity pawl 125 will rise into the path of lever 121 and prevent its backward movement under the tension of spring 122.

The carriage 117, in ordinary practice, is moved along its guides until in a suitable position, when it is fixed in place by means of the screws 129, bearing at their inner ends upon the guides 116, when further adjustment of the center 128 will be made through the lever 121, the spring 122 and the contiguous parts. If desired, the slide 118 may be rigidly secured to the carriage 117 by means of the hand screw 130, the inner end of which bears upon the guides 119.

The center 128 differs from the ordinary center found in the tail stocks of lathes and similar machine tools, in that it comprises a little more than half as illustrated in Fig. 18, of the ordinary center, and is held in the forward end of the slide 118, in a semicylindrical bearing 131, which in turn is secured to the slide by means of the screws 132. The tail of the center 128 is conical and is inserted in the conical seat in the ordinary way of inserting centers in tail stocks, but particular attention is called to the fact that the bearing 131 and the center 128 comprises a little more than half of the corresponding parts in other machines, the purpose being to reduce the height of such parts to the lowest possible limit, so as not to interfere with the cutter 82, when cutting very small pinions and gears.

In gear cutting, it is necessary in order that there shall be great accuracy in the work turned out, as small a resistance between the blank and the cutter as possible, and in order to reduce this resistance to a minimum, it is necessary to have a constant stream of oil over the cutter and blank. In order to provide for this oil supply, I mount a pump 133 upon the bed 1, as clearly illustrated in Fig. 1. This pump may be of any desired or preferred form, being driven by means of a pulley 134, which receives its motion from the belt 135 leading from any convenient source of power, preferably the same shaft which drives the belt 5, heretofore referred to. This pump receives its supply through the pipe 136, from the reservoir 137, located beneath the bed 1. The ordinary check valve 138 is located in the supply pipe 136. Leading from the pump is the feed pipe 139, such feed pipe leading to the pipe 140, through a valve 141, the end of said pipe 140 terminating directly over the cutter 82, as clearly shown in Fig. 10.

In order to provide a convenient mechanism for simultaneously stopping the machine and cutting off the oil supply, I locate a rock shaft 142, upon the bed of the machine, such rock shaft lying parallel with the movement of the slide 58, and mounted in bearings 143 at either end of the machine bed. This rock shaft is provided with an upwardly extending arm 144, at the upper extremity of which is a connecting rod 145 leading to the three-way valve plunger 146 of the valve 141, above referred to, the details of which will be subsequently set forth. Extending downwardly also from the rock shaft 142, is an arm 147 from the lower extremity of which leads the rod 40, to the tripping pawl 33, heretofore described. Adjustably mounted upon the shaft 142, and projecting laterally toward the path of the frame 63, is the striker arm 148, the forward end of said striker arm being provided with a head 149, which lies in the path of the pin 150, projecting laterally from the arm 72, heretofore described. The striker arm 148 is so located upon the rock shaft 142, that when the frame 63 shall have traveled to a point where the stop 79 shall contact the pin 81 on the pawl 73 and thus trip the feed mechanism through the arm 72 and rock shaft 70, the pin 150 will lie directly over the head 149. The impulse of the pin due to the spring 76 will be sufficient to tilt the striker arm 148 downwardly into the position illustrated in Fig. 9, in which position, the connecting rod 145 will have been retracted in the direction of the arrow 151, to close off the oil supply through the pipe 140 and open the valve plunger 146 to direct the flow of oil through the pipe 152, back to the reservoir 137. Simultaneously with this movement, the lower arm 147 will have thrust the rod 40 in the direction of the arrow 153, to trip the locking pawl 33, thereby permitting the spring 30 to shift the belt 5 from the fast pulley 6 to the loose pulley 7, in a manner hereinbefore described. Thus the travel of the slide 58 produces an immediate and simultaneous stoppage, not only of the cutter shaft, but also of the blank spindle and blank, and with it, the feed screw 64, this only occurring when the blank has been completely cut and is ready to be replaced by another blank. The cutter carriage may now be slid forward into position out of the way of the new blank, when the same may be inserted, and in order to form a safety device whereby accidental movement of the slide 58 and with it, the cutter carriage, may be prevented, I locate on the side of the frame 63, a guide 154, in which the vertically moving bolt 155 is located, said bolt being given a normal downward tendency through the spring 156. I provide upon the side of the bolt 155, a pin 157 for engagement with the upper side of the arm 72, so that when said arm is raised in the position indicated in Fig. 8, the bolt 155 will be simultaneously raised, so as to clear the end of the flat stop 157', which is secured to the bed by the bolt passing through the integrally connected supplemental stop 158, secured to the bed by means of the bolt 159, as clearly shown in Figs. 8 and 9.

The valve 141, heretofore referred to, consists of a special casting 160, somewhat like a gas pipe T, having the supply passage 161 into which the discharge pipe 140 is inserted. Centrally through this casting, and at right-angles to the members 161 and 162, is a passage 163, into which is inserted a ported bushing 164. This bushing is provided with a discharge port 165, leading into the discharge pipe 140, and a somewhat elongated port 166, leading from the supply pipe 139. Leading laterally also from this bushing 164, is a return flow port 167, leading to the return pipe 152. The plunger 146 is substantially cylindrical, and fitted closely to slide longitudinally in the bushing 164, to bring the reduced cylindrical portion 168 into alternate registry with the ports 165 and 167 in the bushing 164. The two positions of the plunger 146 will correspond to these two ports 165 and 167, so that while oil is being constantly forced through pipe 139, it may be shunted through either one of these ports to the pipe 140, or the pipe 152, this being governed by the rock shaft 142 through the connecting rod 145. The overflow of oil which is poured upon the cutter 82 is permitted to trickle down over the structure and is caught in the trough 169, around the bed of the machine, from which it is conducted to the reservoir 137 through the pipe 170.

The universal joints in the telescoping shafts 43 and 44 possess novel features which I will now proceed to describe. Referring to Fig. 16, the universal joints 41 and 42, 45 and 47 are all alike, and consist of the duplicate knuckles 171, provided with apertured lugs 172, through which the stud bolts 173 are screwed. The inner or adjacent ends of the studs 173 are conical as at 174, and are inserted in a substantially square block of metal 175. The apertures in the block 175 are conical to fit the conical ends 174 of the studs 173, such apertures being located at right-angles to each other, and being four in number, the two diametrically opposite ones being for the reception of the pins upon one of the knuckles 171, and the other two apertures being for the reception of the corresponding studs upon the other knuckle. The particular feature of this universal joint, resides in the fact that the studs 174 are conical and as wear takes place, between the bearings, the studs 173 may be screwed home so as to readjust the bearing.

I claim:

1. In a gear cutter, the combination of a rotating cutter spindle, a cutter mounted thereon, a work spindle in operative relation to said cutter spindle, supports for said spindles, driving mechanism for simultaneously rotating said spindles, feeding mechanism for advancing one of said spindles relatively to the other spindle, a rock shaft having an arm thereon for directly engaging the support of the advancing spindle, said rock shaft having a connection to said driving mechanism for automatically stopping the same at a predetermined position of said advancing spindle.

2. In a hobbing gear cutter, the combination of a cutter spindle with a hobbing cutter mounted thereon, a work spindle substantially at right-angles to said cutter spindle, feeding mechanism for advancing said cutter spindle in a path parallel to said work spindle, driving mechanism for said spindles consisting of a drive shaft directly connected to said cutter spindle, a driven shaft parallel to said drive shaft and connected by intermediate change gearing to the said work spindle, means for adjusting said driven shaft toward and away from said drive shaft, and change gearing connecting said shafts whereby they are constrained to rotate at a predetermined relative rotational ratio and thereby produce a predetermined relative rate of rotation between said cutter and drive spindles respectively.

3. In a hobbing gear cutter, the combination of cutter and work spindles respectively mounted at right-angles to each other on suitable supports, drive mechanism for said spindles consisting of a drive shaft mounted in fixed bearings and a driven shaft mounted parallel to and adjustable toward and away from said drive shaft, intermeshing change gearing mounted upon said shafts for producing a predetermined relative rotational ratio between them, a flexible shaft directly connecting said drive shaft to said cutter spindle and change gear connection between the driven shaft and the work spindle.

4. In a hobbing gear cutter, the combination of cutter and work spindles respectively mounted at right-angles to each other on suitable supports, drive mechanism for said spindles consisting of a drive shaft mounted in fixed bearings and a driven shaft mounted parallel to and adjustable toward and away from said drive shaft, intermeshing change gearing mounted upon said shafts for producing a predetermined relative rotational ratio between them, a flexible shaft directly connecting said drive shaft to said cutter spindle and change gear connection between the driven shaft and the work spindle, feed mechanism actuated by said work spindle, and drive mechanism for advancing the cutter spindle in a path parallel to the axis of the work spindle.

5. In a hobbing gear cutter, the combination of cutter and work spindles respectively mounted at right-angles to each other on suitable supports, drive mechanism for said spindles consisting of a drive shaft mounted in fixed bearings and a driven shaft mounted parallel to and adjustable toward and away from said drive shaft, intermeshing change gearing mounted upon said shafts for producing a predetermined relative rotational ratio between them, a flexible shaft directly connecting said drive shaft to said cutter spindle and change gear connection between the driven shaft and the work spindle, feed mechanism actuated by said work-spindle drive mechanism, for advancing the cutter spindle in a path parallel to the axis of the work spindle, and mechanism actuated by the advancement of the cutter spindle support for stopping the rotation of said drive shaft.

6. In a hobbing gear cutter, the combination of cutter and work spindles respectively mounted at right-angles to each other in suitable supports, a drive shaft mounted in fixed bearings and directly connected to rotate said cutter spindle, a driven shaft connected to said work spindle by intermediate gearing, a frame located adjacent to said drive shaft for adjustably supporting said driven shaft parallel to and at varying distances from said drive shaft, intermeshing change gears mounted upon said shafts respectively whereby said shafts and spindles are constrained to rotate at predetermined relative ratios.

7. In a hobbing gear cutter, the combination of a cutter spindle and a work spindle, inter-connected driving mechanism for rotating said spindles, feeding mechanism for advancing the cutter spindle in a path parallel to the axis of the work spindle, independently driven means mounted upon the gear cutter bed for supplying a continuous flow of lubricant upon the work operated upon, a rock shaft having an arm thereon for engaging with the support of said advancing spindle, said rock shaft having connections to said lubricant supply means and to said spindle driving mechanism for automatically stopping said spindle driving mechanism and diverting the lubricant supply from the work at a predetermined point of advancement of said cutter spindle.

8. In a hobbing gear cutter, the combination of a cutter slide, a cutter spindle with a cutter rotatably mounted on said slide, feeding mechanism for automatically advancing said slide and with it said cutter upon the work to be operated upon, a rock shaft lying parallel to the path of said cutter slide, and having an adjustable arm thereon for engagement with a projection upon said cutter slide, a connection between said rock shaft and the driving mechanism for said cutter for automatically stopping said driving mechanism and tripping mechanism associated with said arm for tripping said feeding mechanism at a predetermined position of said cutter slide.

9. In a gear cutting mechanism, the combination of a laterally moving cutter spindle, a belt driven shaft, a flexible shaft connecting said cutter spindle and said belt driven shaft, a fast and a loose pulley carried by said shaft, a manually operated lever for shifting a belt from the loose to the fast pulley and a spring for shifting the belt from the fast to the loose pulley, a latch pawl to hold said lever against the action of said spring, and connections between said pawl and said spindle actuated by the lateral movement of said spindle for tripping said pawl.

10. In a gear cutting machine, the combination of a laterally moving cutter spindle, and tripping mechanism, a belt driven shaft, a flexible shaft connecting said spindle and said shaft, a fast and a loose pulley carried by said shaft, a manually operated lever for shifting a belt from the loose pulley to the fast pulley, a spring for shifting the belt from the fast to the loose pulley, a latch pawl for releasing said spring, a rock shaft connected to said latch pawl, and an arm on said rock shaft lying in the path of and actuated by said tripping mechanism to trip said pawl at a predetermined point in the movement of said cutter spindle.

11. In a gear cutting machine, the combination of a cutter spindle mounted upon a slide carriage, a feed screw for feeding the carriage transversely to the axis of said spindle, a belt driven shaft connected to said spindle said shaft carrying fast and loose pulleys, interconnected shafts and gears for driving the carriage feeding screw from said driven shaft, spring actuated belt shifting mechanism adjacent to the belt driven shaft, latch mechanism mounted upon and operated by the movement of said slide carriage for releasing said spring actuated mechanism to shift the belt from the fast to the loose pulley.

12. In a gear cutter provided with a cutter spindle and a work spindle, the combination of work lubricating means mounted upon the gear cutter bed, suitable means for producing and directing a continuous flow of lubricant upon the cutter and work-piece, a lubricant supply well, a valve for directing the flow of lubricant to the work piece and automatic means actuated by the advancement of the cutter spindle for operating said valve to divert said lubricant back to the supply well.

13. In a gear cutter and lubricating means therefor, the combination of a cutter spindle and a work spindle, driving mechanism for rotating said spindles and for advancing the cutter in a path transversely to its axis, a lubricant well secured to the gear cutter bed, a pump mounted thereon provided with independent driving means, means for directing the flow of the pumped lubricant upon the work-piece and cutter, and means operated by said advancing spindle for stopping the flow of lubricant upon the work-piece and diverting it back to the well.

14. In a hobbing gear cutter, the combination of a cutter spindle, a transverse slide upon which said cutter spindle is mounted, a work spindle parallel to said slide, a pair of parallel shafts at right-angles to said slide, one of said shafts being belt driven and flexibly connected to said cutter spindle, a rocker frame in which the other shaft is mounted, means for adjusting said rocker frame and shaft transversely to accommodate change gears between said shafts, and connections for driving said work spindle from said rocker frame shaft.

15. In a hobbing gear cutter, the combination of a cutter spindle, a transverse slide upon which said cutter spindle is mounted, feed mechanism for advancing said slide, a work spindle parallel to said slide, a shaft parallel to said work spindle and driven therefrom, gear connections between said spindle driven shaft and said feed mechanism for feeding said slide, and pawl and ratchet mechanism in said gear connections to permit of independent manual operation of said feed mechanism.

16. In a hobbing gear cutter, the combination of a transverse slide, a cutter spindle carried thereby, feeding mechanism for advancing said slide, a work spindle parallel to said slide, means for driving said feeding mechanism from said work spindle, a belt driven shaft connected to drive said cutter and work spindles, a spring actuated belt shifting mechanism in proximity to said belt driven shaft, a latch pawl for releasing said belt shifting mechanism to cut off the power from said spindles, a rock shaft parallel to said cutter slide carrying a rock arm, a link connecting said rock arm and said latch pawl to operate the latter from the former and means for operating said rock shaft from the advancing transverse slide.

17. In a hobbing gear cutter, the combination of a bed provided with transverse slideways, a slide mounted thereon, an angularly adjustable cutter spindle mounted upon said slide, a bearing box for said spindle, means for longitudinally adjusting said box and spindle to bring various parts of the hobbing cutter successively into operation, and to provide for the angular adjustment of the cutter.

18. In a hobbing gear cutter, the combination of an angularly adjustable cutter spindle, a hobbing cutter mounted thereon, a bearing box for said spindle, a work spindle, a geared connection between said spindles, means for longitudinally adjusting said box and its spindle to bring the teeth of the cutter into synchronous movement with the work to be operated upon.

19. In a hobbing gear cutter, the combination of an angularly adjustable and laterally movable cutter spindle, a hobbing cutter mounted thereon, a work spindle at substantially right-angles to said cutter spindle, means for simultaneously rotating said spindles, means for longitudinally adjusting said cutter spindle to bring the teeth of the cutter into synchronous movement with the work spindle at any angular adjustment of said cutter spindle.

20. In a hobbing gear cutter, the combination of a bed provided with transverse slideways, a slide mounted thereon, feeding mechanism for said slide, a standard mounted upon said slide, a cutter spindle carried by said standard transversely to said slide, a fixed standard mounted upon said bed provided with bearings for a belt driven shaft mounted in said bearings said shaft being disposed at right-angles to said slide ways, a rocker frame pivoted to said fixed standard carrying a second shaft parallel to and transversely adjustable with respect to said belt driven shaft, change gears secured to the ends of said shafts to drive the second shaft from the belt driven shaft and interconnected shafts and gears for operating said slide feeding mechanism from said second shaft.

21. In a hobbing gear cutter, the combination of a bed provided with transverse slide ways, a slide mounted thereon, feeding mechanism therefor, a standard mounted upon said slide carrying a cutter spindle, a belt driven shaft mounted in a fixed standard upon said bed, flexible connections from said shaft to said spindle for driving the latter, fast and loose pulleys upon said shaft, belt shifting mechanism mounted upon said fixed standard, a latch pawl for holding said belt shifting mechanism with the belt upon the fast pulley and a spring for retracting the belt shifting mechanism when said latch is released, a rock shaft mounted upon the bed parallel to said slideways, a rock arm extending vertically from said rock shaft, a link connecting said rock arm to said latch pawl, a rock arm extending horizontally from said rock shaft toward said slide and an adjustable shoe on said slide, operating on said horizontal rock arm to release said latch pawl when said slide reaches a predetermined position.

22. In a gear cutter, a laterally movable cutter spindle, a relatively fixed work spindle, a fixed cutter spindle drive shaft, a work spindle drive shaft, parallel to and adjustable toward and away from said cutter spindle drive shaft, intermeshing change gearing mounted upon said shafts, and flexible shafts connecting said drive shafts respectively with the cutter spindle and work spindle.

23. In a gear cutter, the combination of a cutter spindle and a work spindle, one of said spindles being relatively fixed and the other movable in a path parallel to the axis of the fixed spindle, driving mechanism for said spindles consisting of a relatively fixed drive shaft connected by a flexible shaft to said movable spindle, and a driven shaft parallel to and adjustable toward and away from said drive shaft, said driven shaft being connected by a flexible shaft through intermediate gearing with said fixed spindle, and intermeshing change gears mounted upon said drive and driven shafts.

24. In a gear cutter, the combination of a countershaft standard, a drive shaft rotatably mounted in said standard, and a driven shaft lying parallel with the first mentioned shaft, means for adjusting said driven shaft toward and away from said drive shaft to provide for intermeshing change gears rigidly secured to said shafts, a cutter spindle, a work spindle and flexible shafts connecting said drive and driven shafts respectively with the cutter spindle and the work spindle.

25. In a gear cutter, the combination of a drive shaft bearing standard, a drive shaft rotatably mounted in said standard, a frame pivotally secured to said standard, a driven shaft rotatably mounted in said frame, said driven shaft lying parallel to said drive shaft, intermeshing change gears mounted upon said shafts, means for adjusting the driven shaft frame toward and away from said drive shaft to provide for said change gears, and flexible shafts connecting said drive and driven shafts respectively with the cutter spindle and the work spindle.

26. In a machine tool, provided with a rotating laterally moving tool and a simultaneously rotating work piece, the combination of a drive shaft for said tool, a driven shaft parallel to and adjustable toward and away from said drive shaft, intermeshing change gears mounted upon said shafts and flexible shafts connecting said drive shaft and said driven shaft respectively with said rotating tool and said rotating work piece.

27. In a machine tool, the combination of a rotating laterally moving tool, a rotating but relatively fixed work spindle, with means for driving the said tool and spindle comprising an independently mounted standard, a flexible shaft connecting said drive shaft to said tool, a driven shaft mounted upon said standard parallel to and adjustable toward and away from said drive shaft, intermeshing change gears connecting said drive shaft and driven shafts and a flexible shaft connecting said driven shaft to said work spindle.

28. In a machine tool, the combination of a rotating laterally moving tool, and a rotating relatively fixed work spindle with mechanism for driving said tool and spindle, comprising a stationary drive shaft having a change gear mounted thereon, a driven shaft having a change gear mounted thereon for engagement with the first named change gear, means for adjusting said driven shaft toward and away from said drive shaft, and telescoping shafts with universal couplings connecting said drive and said driven shafts respectively with said tool and said work spindle.

This specification signed and witnessed this 22d day of November 1907.

PLINY CATUCCI.

Witnesses:
 Louis M. Sanders,
 C. A. Alliston.